United States Patent [19]
Sharma

[11] Patent Number: 6,076,130
[45] Date of Patent: Jun. 13, 2000

[54] SYSTEM AND METHOD FOR EFFICIENT COMMUNICATION BETWEEN BUSES

[75] Inventor: Debendra Das Sharma, Santa Clara, Calif.

[73] Assignee: Hewlett-Packard Company, Palo Alto, Calif.

[21] Appl. No.: 09/044,660

[22] Filed: Mar. 19, 1998

[51] Int. Cl.[7] .................................................. G06F 13/38
[52] U.S. Cl. ............................ 710/129; 710/130; 710/52
[58] Field of Search ................................. 710/101, 126, 710/129, 130, 52

[56] References Cited

U.S. PATENT DOCUMENTS

| | | | |
|---|---|---|---|
| 5,535,341 | 7/1996 | Shah et al. | 710/126 |
| 5,687,329 | 11/1997 | Kaiser et al. | 710/128 |
| 5,729,767 | 3/1998 | Jones et al. | 710/62 |
| 5,911,084 | 6/1999 | Jones et al. | 710/62 |

*Primary Examiner*—Xuan M. Thai

[57] ABSTRACT

The inventive mechanism has a bypassable transaction that is directly loaded to the bypass queue. For example, all read transactions from a PCI bus are directly loaded to the bypass queue. This avoids the route through the common queue to the bypass queue for a read transaction that cannot be loaded on the second PCI bus. Two single bit wide queues are required to enforce ordering, the lock queue and the key queue. The lock queue has the same depth as the bypass queue and is affiliated to it. The key queue is affiliated to the common queue and has the same depth as the common queue. When an entry is loaded to the bypass queue, it is locked by setting the corresponding bit in the lock queue to 1 if there is at least one entry in the common queue and the previous entry was loaded into the common queue. If an incoming transaction to the bypass queue is locked in the lock queue, the entry in the key queue corresponding to the last entry in the common queue is also set to 1. Thus, for every locked entry in the bypass queue a key is set in the common queue. A locked entry cannot be unloaded until the corresponding keyed entry is unloaded.

29 Claims, 4 Drawing Sheets

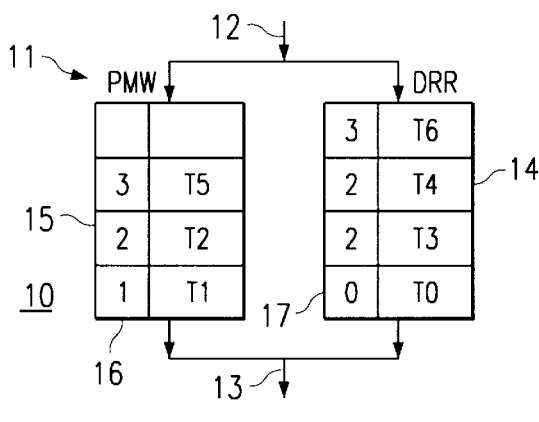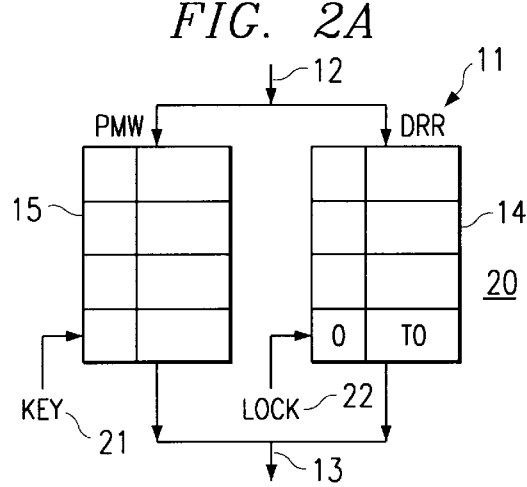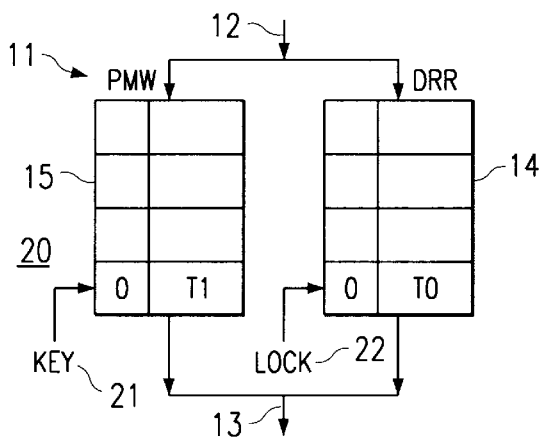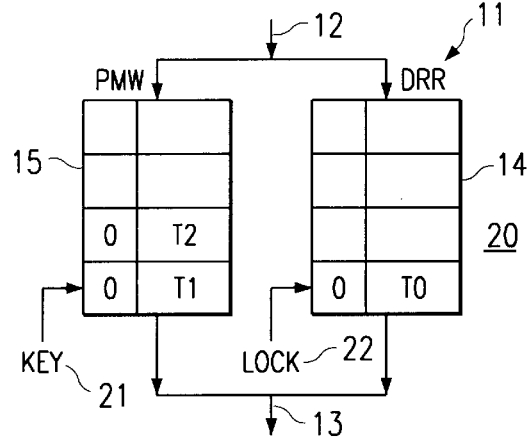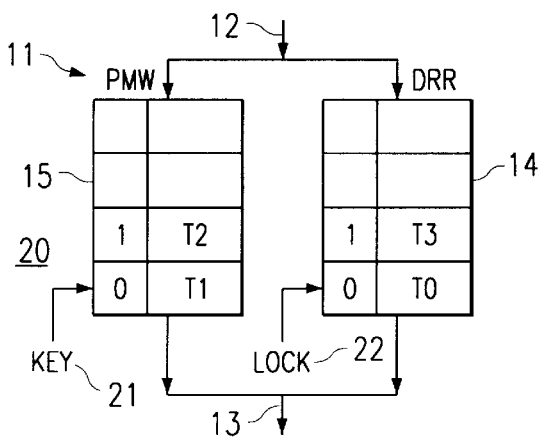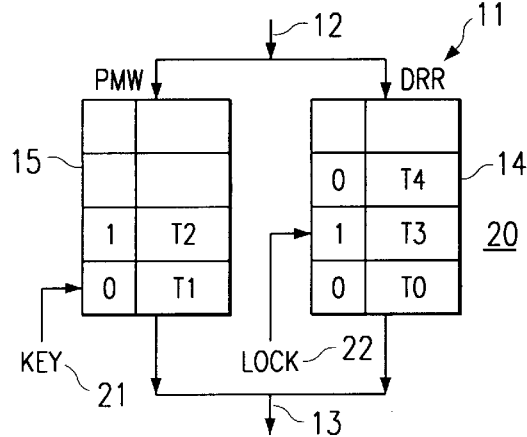

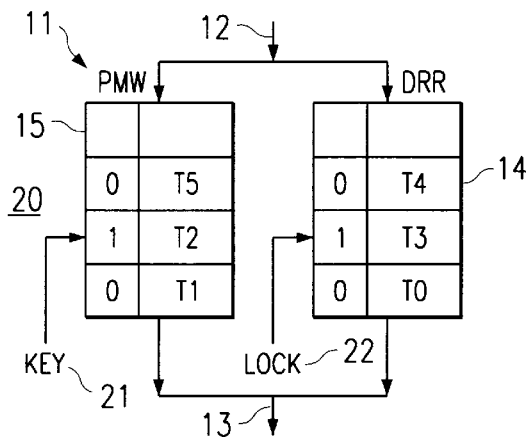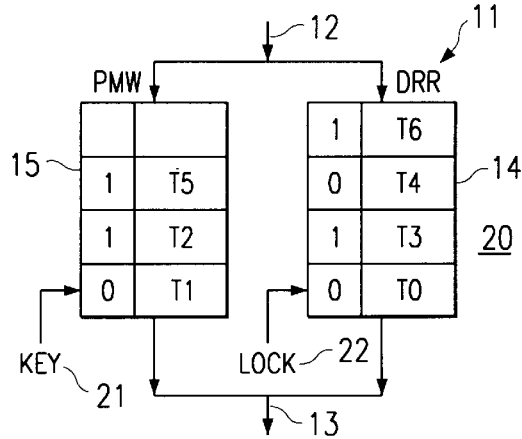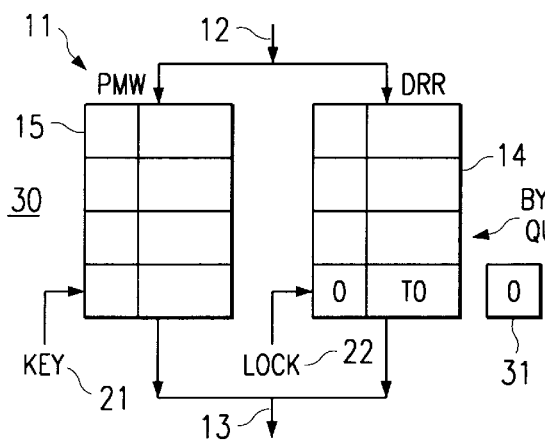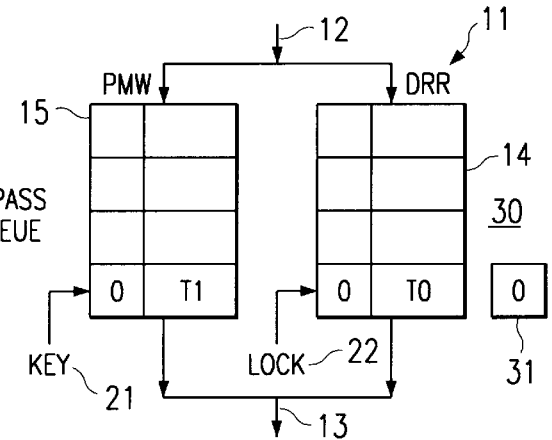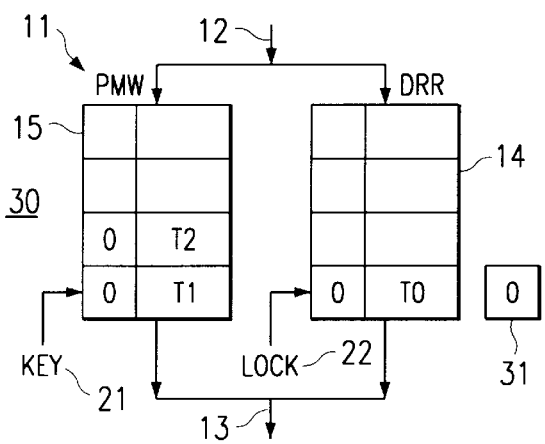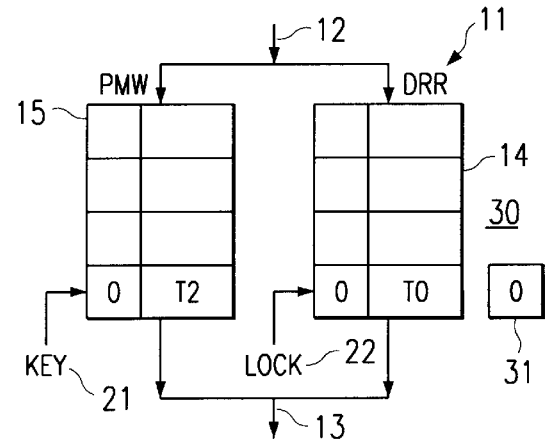

SYSTEM AND METHOD FOR EFFICIENT COMMUNICATION BETWEEN BUSES

TECHNICAL FIELD OF THE INVENTION

This application relates in general to computer systems, and in specific to a mechanism for routing transactions with ordering constraints.

BACKGROUND OF THE INVENTION

In an interconnected computer network, the devices communicate through transactions. A transaction comprises one or more packets and conveys some meaningful information. For example, a CPU in a multiprocessor network may respond to a snoop request with a "snoop response" transaction. Generally, a packet consists of a fixed number of transfers or cycles in the interconnect structure. Different transactions may require different numbers of packets.

The flow of the different types of transactions is controlled by ordering constraints. These constraints specify the ordering relationship of every transaction with respect to others. A certain transaction type may be required to bypass other transaction types to guarantee forward progress, and the certain transaction types may be forbidden to bypass some other transaction types to guarantee ordering. Typically, these ordering rules are provided by an ordering table which specifies the ordering relationship between every pair of transaction types.

For any pair of transaction types P and Q, the ordering table specifies if P should bypass Q or if P should not bypass Q or if it does not matter if P bypasses Q. Similarly, another entry in the table would specify if Q could bypass P. An example of ordering constraints can be found in the ordering table in the PCI bus specification, PCI Local Bus Specification, Rev. 2.1, PCI Special Interest Group, Portland, OR, June 1995. These ordering rules are traditionally implemented by loading all incoming transactions to a common queue. A bypassable transaction is subsequently loaded to a separate bypass queue (or a system of queues) when it moves to the head of the common queue.

FIG. 4 depicts a typical prior art arrangement 40 for implementing a subset of PCI transactions on a PCI to PCI bridge 41 connecting two PCI buses, bus A 42 and B 43. This arrangement would handle two types of PCI transactions, the posted memory write (PMW) and the delayed read request (DRR). A PMW transaction is required to bypass earlier DRR transactions to avoid deadlock. However, a DRR transaction is not allowed to bypass PMW transactions to enforce the ordering model. Transactions arriving at PCI bus bridge 41 from PCI bus A 42, need to be queued in such a way that these ordering restrictions are maintained. Thus, this approach uses two queues, a bypass queue 44 for DRR transactions only, and a common queue 45 where both PMW and DRR transactions are loaded. Both DRR and PMW transactions are stored into common queue 45 from PCI bus A. When a DRR transaction gets to the head of common queue 45, it is then loaded to the bypass DRR queue 44. Thus, if there are any PMWs after the DRR, they can bypass the DRR and be sent out over PCI bus B 43. The DRR will be sent out after all of the PMWs have been sent out.

A problem with this arrangement is that although it meets the ordering requirements of the PCI specification, it degrades performance by not fully utilizing the available bandwidth of PCI bus B 43. The under utilization of the PCI bus B arises when a DRR transaction is loaded to the bypass queue from the common queue. Being a FIFO structure, the common queue cannot unload a subsequent PMW transaction to the PCI bus B when a DRR transaction at its head is being unloaded to the bypass queue. Thus, the prior art arrangement is not able to achieve the maximum bandwidth available on the PCI bus B.

Another problem with this arrangement is that the common queue must be of a large size. Certain types of large transactions require a large amount of storage space. Ideally, these large transactions would not be queued, but would rather be sent immediately over the bus. However, to maintain ordering, these transactions must be able to fit into the common queue along with the other transactions.

Therefore, there is a need in the art for a mechanism which will eliminate this performance bottleneck, while still maintain ordering, and reducing the required size of the common queue.

SUMMARY OF THE INVENTION

These and other objects, features and technical advantages are achieved by a system and method which uses a mechanism that loads the bypass queue (or system of queues) with bypassable transactions at the source and without making them pass through the common queue. The mechanism maintains ordering with additional control logic. Therefore, the common queue is bifurcated from the bypass queue, i.e. the common queue does not feed into the bypass queue.

At the time of loading the transaction, control logic determines if the transaction is bypassable, and if so it places the transaction directly into the bypass queue. If the transaction is not bypassable, then the control logic loads the transaction into the common queue. The mechanism uses additional fields within the queues to maintain ordering between the different transactions stored in the different queues. The fields will determine whether a particular transaction came before or after another transaction. Each transaction is stored with an additional bit which is used to maintain ordering. The additional bit field is in both the common and bypass queues, with one field for each transaction.

It is a technical advantage of the invention to increase performance by bifurcating the common queue and the bypass queue.

It is another technical advantage of the invention to load the bypass queue directly from the bus.

It is a further technical advantage of the invention that bypassable transactions are loaded only once, which improves the utilization of the resources into which these queues feed.

It is a further technical advantage of the invention that the common queue storage may be reduced, since it does not have bypassable transactions, thus leading to potential improvement in performance due to less flow-control.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 depicts the inventive arrangement for implementing PCI transactions on a PCI to PCI bridge connecting two PCI buses;

FIGS. 2A–2G depict a sequence of loading transactions into a single bit version of the arrangement of FIG. 1;

DESCRIPTION OF THE PREFERRED EMBODIMENTS

Figure 3E:
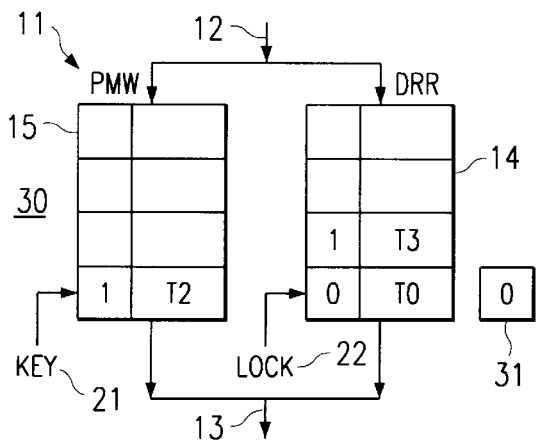
FIGS. 3A–3N depict a sequence of loading and unloading transactions into and out of a single bit version of the arrangement of FIG. 1.

FIG. 1 depicts the inventive arrangement 10 for implementing PCI transactions on a PCI to PCI bridge 11 connecting two PCI buses, 12 and 13. This arrangement would handle two types of PCI transactions, the posted memory write (PMW) and the delayed read request (DRR). A PMW transaction is required to bypass earlier DRR transactions to avoid deadlock. However, a DRR transaction is not allowed to bypass PMW transactions to enforce the ordering model. Transactions arriving at PCI bus bridge 11 from PCI bus 12, need to be queued in such a way that these ordering restrictions are maintained. Thus, this approach uses two queues, a bypass queue 14 for DRR transactions only, and a common queue 15 where PMW transactions are loaded. Control logic (not shown) would determine which queue is loaded with a particular transaction.

Note the two transactions, PMW and DRR, are by way of example only. The inventive mechanism can operate with any number of transaction types with any protocol. Further note that the term 'queue' implies a FIFO (first-in-first-out) structure.

FIG. 1 depicts a series of transactions arriving at the bridge 11, T0, T1, T2, T3, T4, T5, and T6, in that order. T0, T3, T4, and T6 are DRR transactions, and thus bypassable, and will be loaded in the bypass queue 14 as shown. T1, T2, and T5 are PMW transactions, and will be loaded in the common queue 15 as shown. The mechanism uses tags 16, 17 to maintain ordering between the different transactions in the different queues. Ordering is maintained within each queue by virtue of the entry location of each transaction. For example, in the common queue 15, T1 is at the head, while T2 and T5 are sequentially behind T1. Similarly for the bypass queue 14, wherein T0, T3, T4, and T6 are stored in their respective orders. Thus, tags 16 and 17 are used to maintain the order between the queues and indicate which entry at the head of each queue is an earlier transaction.

As shown in FIG. 1, the tag 16 indicated the entry location of the latest transaction in the common queue 15. Thus, when T0 is loaded in bypass queue, the common queue is empty, and T0 is tagged with 0. Next T1 and T2 are loaded into the common queue 15, and are tagged with 1 and 2 respectively. When T3 comes into the bypass queue 14, the latest entry in the common queue is T2 with a tag of 2, and thus T3 is tagged with 2. Similarly, when T4 comes into the bypass queue 14, the latest entry in the common queue is still T2 with a tag of 2, and thus T4 is tagged with 2. Next T5 is loaded into the common queue and tagged with 3. Thus, when T6 comes into the bypass queue 14, the latest entry in the common queue is T5 with a tag of 3, and thus T6 is tagged with 3.

The tag numbers indicate the number of PMW transactions that must be sent out before any particular DRR transaction can be attempted to be sent out. For example, T0 has a tag of 0, which indicates that no PMW transactions need to be sent out before T0 can be attempted to be sent out. However, the PMW transactions could be sent out before T0 is attempted. T3 and T4 must wait for two PMW transactions to be sent out before they are sent out, while T6 must wait for three PMW transactions. Note that all PMW transactions can be unloaded before any of the DRR transactions are unloaded, because writes can bypass the reads, but reads cannot bypass the writes. Thus, the flow control rule is that an entry from read or bypass queue is sent out if its tag is less than the tag value of the write that is at the head of the write or common queue or if the common queue is empty.

Therefore, T0 can be initially removed from read queue 14, because its tag is less than the tag value of 1 for the T1 transaction at the head of the write queue 15. However, to emphasize the point that reads can be bypassed, assume T1 is unloaded first. Note that this rule assures that a read will always retrieve the latest value for a particular entry, i.e. if reads bypassed writes then the read will read an old value. Then T2 is unloaded next with its tag value of 2. Thus, the write queue has only one entry T5 with a tag of 3. Next, T0 will be unloaded from the read queue. Control logic (not shown) compares the tag of T0 with the tag of transaction at the head of the write queue, which is T5 with a tag of 3. Since the tag of T0 is less than the tag of T5, then T0 can be unloaded. T3 and T4 also can be unloaded, since their tags are also less than the tag of T5. Note that the control logic can also compare the tag of the latest write transaction to be unloaded with the read transaction, thus the control logic will determine whether the read tag is less than or equal to the tag of the unloaded write, in which case the read can be unloaded. T6 cannot be unloaded until T5 is unloaded, because the tag of T6 is equal to the tag of T5. Thus, after T5 is unloaded, then the control logic will release T6. Note that the tags indicate the number of write transactions that must be unloaded before the read transaction unload can be attempted.

Note that the tags of FIG. 1 will keep increasing. As each write transaction comes in, an incrementally higher tag value is assigned. Thus, to limit the size of the tag, a single bit arrangement is used. FIGS. 2A–2G depict the loading of a single bit version 20 of the arrangement of FIG. 1. The sequence of transactions is the same as in FIG. 1. The tags of FIG. 1 are now referred to as keys and locks. The key bit 21 is associated with the write or common queue 15, and the lock bit 22 is associated with the read or bypass queue 14. Thus, each transaction has an associated tag bit, either a lock or a key depending upon which queue the transaction is stored in. A locked bit or '1' tagged onto a read transaction will prevent the read transaction from being unloaded, until a write transaction with a key bit has been unloaded. For example, as shown in FIG. 2G, T0 does not have a lock bit, thus T0 can be unloaded at any time. T1 does not have a key bit, thus no read transactions sequentially followed T1. T2 has a key bit and T3 has a lock bit, since read T3 followed write T2. Thus, T3 cannot be unloaded until T2 has been unloaded. Note that each time a read is locked, a key is inserted into a corresponding write. Read T4 is not locked, since T4 follows read T3, which is locked by T2, thus, T4 cannot be unloaded until T2 is unloaded. T5 has a key bit and T6 has a lock bit, since read T6 followed write T5. Thus, T6 cannot be unloaded until T5 has been unloaded. Therefore, the flow control rule is that every time a switch is made from the write or common queue to the read or bypass queue, the transactions prior and subsequent to the switch are keyed and locked, respectively. Note that this assumes that there is an entry in the write or common queue at the time of the switch. Otherwise, zeros are loaded into the tag values.

In FIG. 2A, transaction T0 is loaded into the read queue 14. Since the write queue is empty and a switch has not been made, the lock bit tag is 0. In FIG. 2B, transaction T1 is loaded into the write queue 15. Since a switch has not been made from write to read, the key bit tag is 0. In FIG. 2C, transaction T2 is loaded into the write queue 15. Since a switch has not been made, the key bit tag is 0. In FIG. 2D, transaction T3 is loaded into the read queue 14. Since a switch has been made from write to read while an entry is in the write queue, T2 has its key bit changed to 1 and the lock bit of T3 is tagged 1. Thus, the lock on T3 will prevent T3 from being unloaded before T2 is unloaded. In FIG. 2E, transaction T4 is loaded into the read queue 14. Since a switch has not been made from the write queue into the read queue, then the lock bit of T4 is tagged 0. Note that the lock on T3 will prevent T4 from being unloaded before T2 is unloaded. In FIG. 2F, transaction T5 is loaded into the write queue 15. Since a switch has not been made from the write queue to the read queue, the key bit of T5 is tagged 0. In FIG. 2G, transaction T6 is loaded into the read queue 14. Since a switch has been made while an entry is in the write queue, T5 has its key bit changed to 1 and the lock bit of T6 is tagged 1. Thus, the lock on T6 will prevent T6 from being unloaded before T5 is unloaded.

Figure 3F:
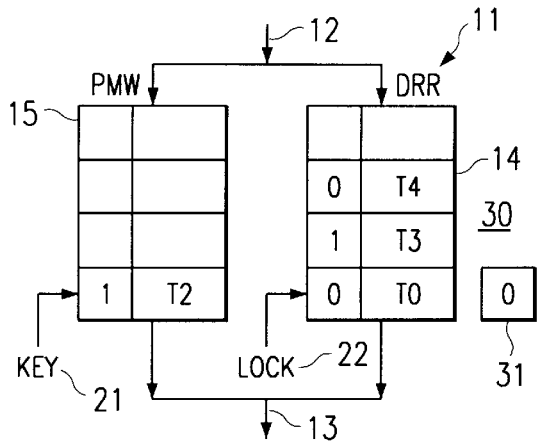
Figure 3G:
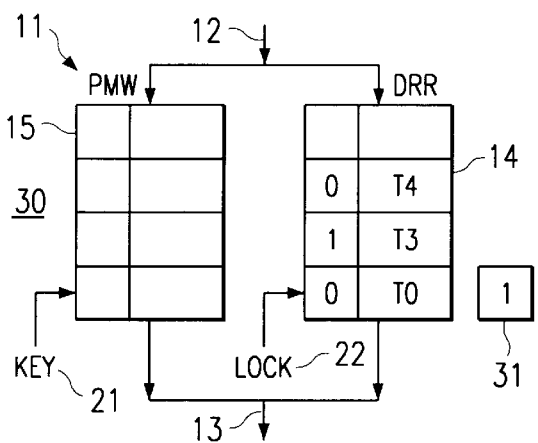
Figure 3H:
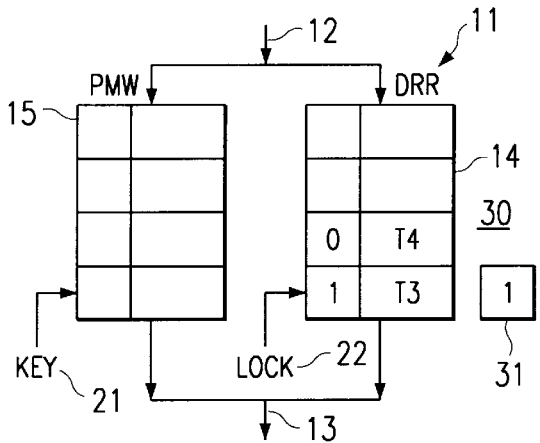
Figure 3I:
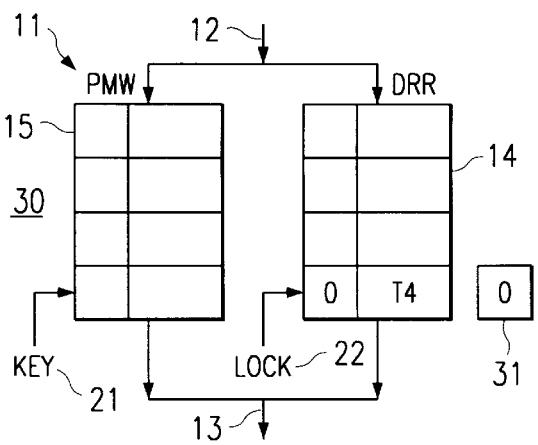
Figure 3J:
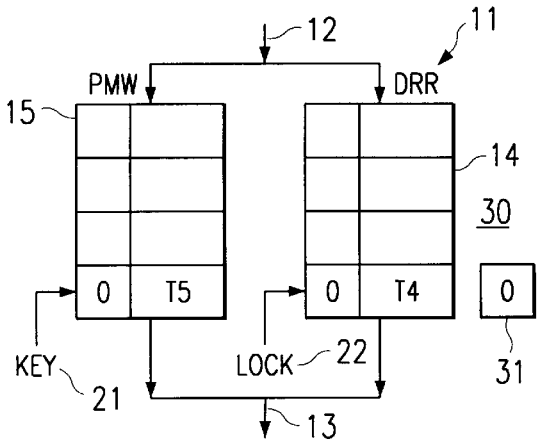
Figure 3K:
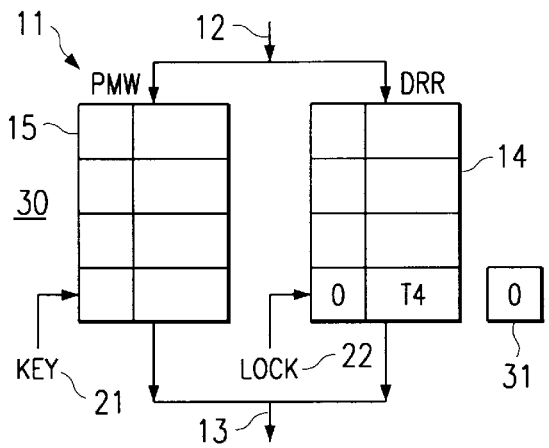
Figure 3L:
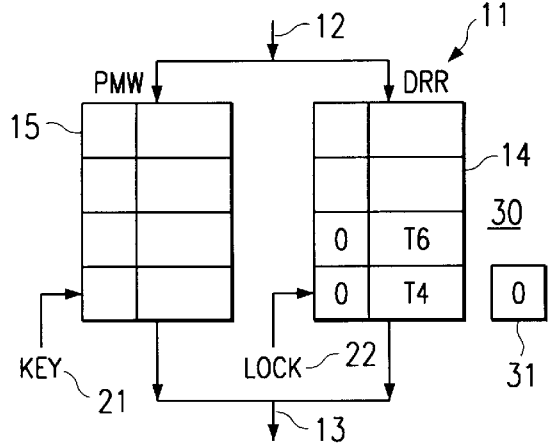
Figure 3M:
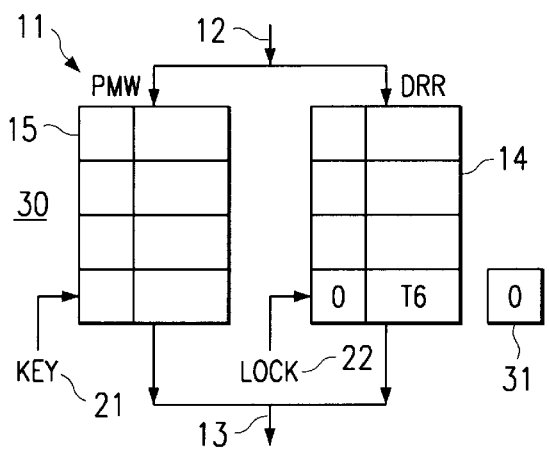
Figure 3N:
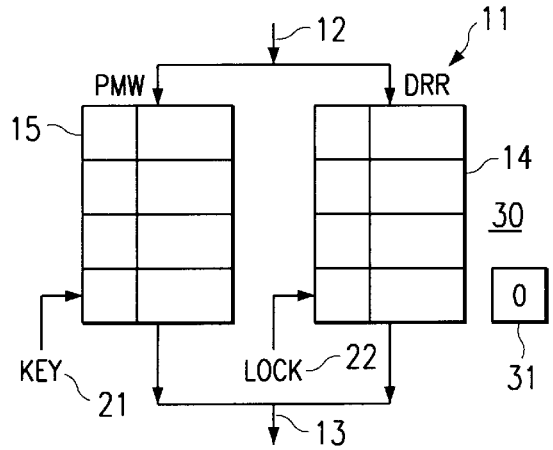
Figure 4:
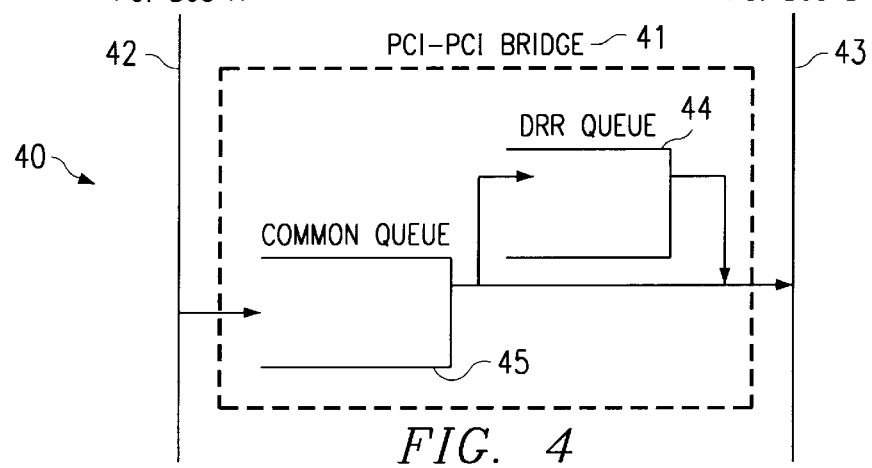
FIG. 4 depicts a prior art arrangement for implementing a PCI transactions on a PCI to PCI bridge connecting two PCI buses.

FIGS. 3A–3N depict the loading of a single bit version 30 of the arrangement of FIG. 1, but include unloading operations mixed with the loading operations. The unloading decisions are made by the control logic (not shown), and depend upon external factors, such as queue space at the destination for the transactions. The sequence of transactions is the same as in FIGS. 1 and 2. FIGS. 3A–3N include key register 31, which maintains a count of the keys that have been unloaded with the write transactions. The key register is incremented as write transactions with keys are unloaded, and is decremented as read transactions with locks are unloaded. The arrangement of FIG. 3 operates according to the following rules; which forms the rules that can be used in any system:

Rule 1: A key is released when a transaction in the common queue is unloaded that has its key set to 1. The key register or counter is incremented by 1.

Rule 2: A transaction from the bypass queue is considered to be ready for unloading if it is not locked, i.e. lock=0, or if the key register is greater than zero.

Rule 3: An entry from the bypass queue is unloaded only if it is ready, as defined in Rule 2.

Rule 4: When a locked entry from the bypass queue is unloaded, the key register is decremented by 1.

Rule 5: the key register is set to 0 during power on.

As shown in FIG. 3A, transaction T0 is loaded into the read queue 14. Since write queue is empty and a switch has not been made, the lock bit tag is 0. Since no keys or locks have been unloaded, the key register 31 remains at 0, the initialized value. In FIG. 3B, transaction T1 is loaded into the write queue 15. Since a switch has not been made, the key bit tag is 0. In FIG. 3C, transaction T2 is loaded into the write queue 15. Since a switch has not been made, the key bit tag is 0. In FIG. 3D, transaction T1 is unloaded. Since T1 was not keyed, the key register 31 remains at 0. In FIG. 3E, transaction T3 is loaded into the read queue 14. Since a switch has been made from loading into the write queue to the read queue, while an entry is in the write queue, T2 has its key bit changed to 1 and the lock bit of T3 is tagged 1. Thus, the lock on T3 will prevent T3 from being unloaded before T2 is unloaded.

In FIG. 3F, transaction T4 is loaded into the read queue 14. Since a switch has not been made from the write queue into the read queue, the lock bit of T4 is tagged 0. Note that the lock on T3 will prevent T4 from being unloaded before T2 is unloaded. In FIG. 3G, transaction T2 is unloaded. Since T2 was keyed, the key register 31 is incremented to 1. In FIG. 3H, transaction T0 is unloaded. Since T0 was not locked, the key register 31 is maintained at 1. In FIG. 3I, transaction T3 is unloaded. Since T3 was locked, the key register 31 is decremented by 1 to 0. In FIG. 3J, transaction T5 is loaded into the write queue 15. Since a switch has not been made, the key bit of T5 is tagged 0. In FIG. 3K, transaction T5 is unloaded. Since T5 was not keyed, the key register 31 remains at 0. In FIG. 3L, transaction T6 is loaded into the read queue 14. Note that a switch has been made, however, the write queue is empty, thus the lock bit of T6 is tagged 0. In FIGS. 3M and 3N, transactions T4 and T6 are respectively unloaded.

Note that the sequence shown in FIGS. 2 and 3 is by way of example only, as the loading and unloading of the queues can occur in many different sequences so long as the order and bypassing rules are followed.

Also note that the inventive mechanism will operate with a single common queue and multiple bypass queues. Each bypass queue would hold a particular transaction. Corresponding rules as to which transactions can bypass which transactions would have to be written and placed into the control logic. A table would detail, for every pair of transactions Ti and Tj, if Ti can bypass Tj, if Ti cannot bypass Tj, or if it does not matter whether Ti can bypass Tj or not. The mechanism would have a separate key bit in the common queue for each of the bypass queues. Thus, the write queue in FIGS. 2 and 3 would have multiple key bit entries, one for each read queue. Each read queue would have a single lock bit. Thus, a single entry in the write queue will control the unloading of multiple read or bypassed entries in the read queues.

Further note that the inventive mechanism will operate with multiple common queues and a single bypass queue. The mechanism would have a separate lock bit in the bypass queue for each of the common queues. Thus each of the write queues in FIGS. 2 and 3 would have a single key bit entry, while the read queue would have multiple lock bit entries, one for each write queue. Thus, each bypassed transaction would have to ensure that transactions from both write queues have been unloaded before unloading the read transaction.

Further note that the inventive mechanism will operate with multiple common queues and a multiple bypass queues. One pair of lock-key queues are needed for each bypass queue associated to a common queue. The inventive mechanism will also operate on a hierarchial structure where a common queue with one or more bypass queues feed another common queue at a higher level. In that case, the common queues along with the bypass queues in the higher level are loaded from the output of the common queue and the bypass queues in the lower level.

Although the present invention and its advantages have been described in detail, it should be understood that various changes, substitutions and alterations can be made herein without departing from the spirit and scope of the invention as defined by the appended claims.

What is claimed is:

1. A bus bridge which connects a first bus to a second bus, wherein the bridge facilitates the transfer of a sequence of transactions from the first bus to the second bus, and wherein the sequence of transactions includes a plurality of types of transactions, the bridge comprising:

a first queue for storing at least one transaction of a particular type of transaction which can be bypassed by at least one other type of transaction of the plurality of types of transactions; and a second queue for storing at least one transaction of the at least one other type of transaction;

wherein the at least one particular type of transaction is routed directly to the first queue from the first bus.

2. The bus bridge of claim 1, wherein:

the particular transaction is a read request and the first queue is read queue; and the at least one other type of transaction is a write transaction and the second queue is a common queue.

3. The bus bridge of claim 1, further comprising:

a first set of tag registers, with one tag register associated with each entry of the first queue; and a second set of tag registers, with one tag register associated with each entry of the second queue.

4. The bus bridge of claim 3, wherein:

the first and second sets of tag registers ensure that flow control rules are obeyed.

5. The bus bridge of claim 4, wherein:

transactions stored in the bus bridge are unloaded onto the second bus according to the flow control rules.

6. The bus bridge of claim 5 wherein:

the flow control rules include bypass rules which define which transaction types of the plurality of transaction types can bypass other transaction types of the plurality of transaction types.

7. The bus bridge of claim 6, wherein:

the flow control rules include an ordering constraint which limits handling of the transactions according to the sequence of receipt from the first bus as modified by the bypass rules.

8. The bus bridge of claim 3, wherein:

each tag register of the second set is loaded with one of a key bit and an non-key bit;

a particular tag register of the second set for a particular transaction that is loaded into the second queue is loaded with the non-key bit; and the particular tag register is reloaded with the key bit if a subsequent transaction to the particular transaction is loaded into the first queue and the particular transaction is present in the second queue when the subsequent transaction is loaded.

9. The bus bridge of claim 3, wherein:

each tag register of the second set is loaded with one of a key bit and an non-key bit;

each tag register of the first set is loaded with one of a lock bit and an unlock bit; and a particular tag register of the first set for a particular transaction that is loaded into the first queue is loaded with the lock bit, if a prior transaction was loaded into the second queue having a tag register loaded with the key bit and the prior transaction is present in the second queue when the particular transaction is loaded into the first queue, otherwise the particular tag register will be loaded with the unlock bit.

10. The bus bridge of claim 8, wherein:

each tag register of the first set is loaded with one of a lock bit and an unlock bit; and a particular tag register of the first set for a particular transaction that is loaded into the first queue is loaded with the lock bit, if a prior transaction was loaded into the second queue having a tag register loaded with the key bit and the prior transaction is present in the second queue when the particular transaction is loaded into the first queue, otherwise the particular tag register will be loaded with the unlock bit.

11. The bus bridge of claim 10, wherein:

a certain transaction that is loaded into the first queue and has an associated tag register loaded with the lock bit is prevented from being unloaded onto the second bus until another transaction that is loaded into the second queue and has an associated tag register loaded with the key bit is unloaded onto the second bus.

12. The bus bridge of claim 11, further comprising:

a key register which tracks both a number of transactions which have been unloaded and have the key bit in their associated tag register, and a number of transactions which have been unloaded and have the lock bit in their associated tag register.

13. The bus bridge of claim 12, wherein:

the key register is incremented for each transaction which has been unloaded and has the key bit in their associated tag register; and wherein the key register is decremented for each transaction which has been unloaded and has the lock bit in their associated tag register.

14. The bus bridge of claim 13, wherein:

the particular transaction is a read request and the first queue is read queue; and the at least one other type of transaction is a write transaction and the second queue is a common queue.

15. A method for transferring of a sequence of transactions from a first bus to a second bus through a bus bridge, wherein the sequence of transactions includes a plurality of types of transactions, the method comprising the steps of:

routing, directly from the first bus to a first queue, at least one transaction of a particular type of transaction which can be bypassed by at least one other type of transaction of the plurality of types of transactions;

storing the at least one transaction in the first queue; and storing at least one transaction of the at least one other type of transaction in a second queue.

16. The method of claim 15, wherein:

the particular transaction is a read request and the first queue is read queue; and the at least one other type of transaction is a write transaction and the second queue is a common queue.

17. The method of claim 15, further comprising the steps of:

providing a first set of tag registers, with one tag register associated with each entry of the first queue; and providing a second set of tag registers, with one tag register associated with each entry of the second queue.

18. The method of claim 17, further comprising the step of:

ensuring that flow control rules are obeyed via the first and second sets of tag registers.

19. The method of claim 18, further comprising the step of:

unloading transactions stored in the bus bridge onto the second bus according to the flow control rules.

20. The method of claim 19, wherein:

the flow control rules include bypass rules which define which transaction types of the plurality of transaction types can bypass other transaction types of the plurality of transaction types.

21. The method of claim 20, wherein:

the flow control rules include an ordering constraint which limits handling of the transactions according to the sequence of receipt from the first bus as modified by the bypass rules.

22. The method of claim 17, further comprising the steps of:

loading each tag register of the second set with one of a key bit and an non-key bit; and loading each tag register of the first set with one of a lock bit and an unlock bit.

23. The method of claim 17, further comprising the steps of:

loading a particular tag register of the second set for a particular transaction that is loaded into the second queue with a non-key bit; and reloading the particular tag register with a key bit, if a subsequent transaction to the particular transaction is loaded into the first queue and the particular transaction is present in the second queue when the subsequent transaction is loaded.

24. The method of 17, further comprising the step of:

loading a particular tag register of the first set for a particular transaction that is loaded into the first queue with a lock bit, if a prior transaction was loaded into the second queue having a tag register loaded with the key bit and the prior transaction is present in the second queue when the particular transaction is loaded into the first queue, otherwise loading the particular tag register with an unlock bit.

25. The method of claim 23, further comprising the step of:

loading a particular tag register of the first set for a particular transaction that is loaded into the first queue with a lock bit, if a prior transaction was loaded into the second queue having a tag register loaded with the key bit and the prior transaction is present in the second queue when the particular transaction is loaded into the first queue, otherwise loading the particular tag register with an unlock bit.

26. The method of claim 25, further comprising the step of:

preventing a certain transaction that is loaded into the first queue and has an associated tag register loaded with the lock bit from being unloaded onto the second bus until another transaction that is loaded into the second queue having an associated tag register loaded with the key bit is unloaded onto the second bus.

27. The method of claim 26, further comprising the step of:

tracking, via a key register, a number of transactions which have been unloaded and have the key bit in their associated tag register, and a number of transactions which have been unloaded and have the lock bit in their associated tag register.

28. The method of claim 27, further comprising the steps of:

incrementing the key register for each transaction which has been unloaded and has the key bit in their associated tag register; and decrementing the key register for each transaction which has been unloaded and has the lock bit in their associated tag register.

29. The method of claim 28, wherein:

the particular transaction is a read request and the first queue is read queue; and the at least one other type of transaction is a write transaction and the second queue is a common queue.

* * * * *